United States Patent [19]

Richardson et al.

[11] 4,232,741

[45] Nov. 11, 1980

[54] TEMPORARILY PLUGGING A SUBTERRANEAN RESERVOIR WITH A SELF-FOAMING AQUEOUS SOLUTION

[75] Inventors: Edwin A. Richardson, Houston; Ronald F. Scheuerman, Bellaire; David C. Berkshire, Houston; Joseph Reisberg, Houston; James H. Lybarger, Houston, all of Tex.

[73] Assignee: Shell Oil Company, Houston, Tex.

[21] Appl. No.: 62,204

[22] Filed: Jul. 30, 1979

[51] Int. Cl.³ ............... E21B 33/16; E21B 43/16; E21B 43/27

[52] U.S. Cl. .................... 166/281; 166/291; 166/273; 166/292; 166/305 R

[58] Field of Search ............ 166/285, 291, 294, 307, 166/292, 281, 282, 273, 274, 305 R, 309

[56] References Cited

U.S. PATENT DOCUMENTS

| | | | |
|---|---|---|---|
| 3,269,460 | 8/1966 | Hardy et al. | 166/274 |
| 3,299,953 | 1/1967 | Bernard | 166/285 |
| 3,330,346 | 7/1967 | Jacobs et al. | 166/273 |
| 3,335,792 | 8/1967 | O'Brien et al. | 166/273 |
| 3,464,491 | 9/1969 | Froning | 166/294 X |
| 3,491,832 | 1/1970 | Raza | 166/273 X |
| 3,612,179 | 10/1971 | Anderson et al. | 166/281 |
| 3,815,681 | 6/1974 | Richardson | 166/281 |
| 3,893,511 | 7/1975 | Root | 166/305 R |
| 4,026,361 | 5/1977 | Knapp et al. | 166/294 X |

*Primary Examiner*—Stephen J. Novosad

[57] ABSTRACT

Portions of a subterranean reservoir are temporarily plugged by injecting an aqueous liquid solution which contains nitrogen gas-generating reactants, a foaming surfactant and a pH controlling system arranged so that the solution remains relatively unreactive within the well but forms a relatively immobile foam within the pores or other openings within the reservoir formation.

10 Claims, 4 Drawing Figures

TEMPORARILY PLUGGING A SUBTERRANEAN RESERVOIR WITH A SELF-FOAMING AQUEOUS SOLUTION

BACKGROUND OF THE INVENTION

This invention relates to injecting a delayed and moderated self-foaming aqueous liquid into preferentially permeable pores or other openings in or along a reservoir formation to temporarily fill or plug those openings with a relatively immobile foam.

The temporary filling or plugging of such openings with foam is a known procedure. Numerous ways for conducting and utilizing such a process are described in patents such as the following: U.S. Pat. No. 3,273,643 describes sequentially adding foaming surfactants and gas-generating reactants to "drowned" wells to initiate an in situ foam generation which displaces liquid and reduces the hydrostatic pressure. U.S. Pat. No. 3,299,953 describes injecting foam or alternating slugs of gas and aqueous surfactant into a mud-filled annulus around a pipe string being cemented into a wellbore to both displace the mud and temporarily plug the openings within the adjacent earth formations. U.S. Pat. No. 3,612,179 describes a reservoir acidization in which a sequency of acid, surfactant, gas, and acid, is injected so that foam temporarily plugs the most permeable portions and diverts the acid into less permeable portions of the reservoir. U.S Pat. No. 3,893,511 describes a process for producing oil from a reservoir having a dual permeability system by injecting alternating slugs of surfactant and gas, so that foam plugs the most permeable openings and diverts gas into less permeable openings, with the oil being recovered during a backflow production operation. And, U.S. Pat. No. 4,130,165 describes a process for reducing water coning by injecting a slug of gas followed by a slug of oil containing an emulsifier, then backflowing, in order to form an emulsion or foam that plugs zones from which water is produced.

Particularly useful gas-generating aqueous liquid solutions are described in a copending Patent Application Ser. No. 902,636 filed May 4, 1978, by E. A. Richardson and R. F. Scheuerman, which relates to reducing hydrostatic pressure within a liquid-containing wellbore. The 902,636 application describes injecting a solution of nitrogen gas-forming reactants with the composition and concentration of the solution being correlated with the pressure, temperature and volume properties of the well and reservoir so that the solution remains substantially unreactive until it reaches a selected depth within the borehole and then generates gas at a moderately rapid rate. Patent Application Ser. No. 28,025 filed Apr. 6, 1979, by E. A. Richardson, R. F. Scheuerman and D. C. Berkshire relates to chemically inducing a backsurge of fluid through well casing perforations. The 28,025 application describes injecting a solution of nitrogen gas-forming reactants through the well casing perforations and into the reservoir. It uses a backsurge-inducing solution which comprises the solution of the 902,636 application modified by adding a reaction-retarding alkaline buffer and a pH-reducing reactant capable of subsequently overriding that buffer. The composition is ranged so that the solution remains substantially unreactive within the well but, within the reservoir, becomes an acidic, fast-reacting solution which generates a rapid-rising pulse of heat and gas that causes a debris-removing backsurging of fluids through the casing perforations. The disclosures of the 902,636 and 28,025 applications are incorporated herein by cross reference.

SUMMARY OF THE INVENTION

The present invention relates to temporarily plugging pores or other openings in or along a subterranean reservoir by flowing through a well and into those openings a self-foaming aqueous solution which remains substantially unreactive until it has entered the openings. That solution is compounded by dissolving in an aqueous liquid (a) a reactant for generating nitrogen gas at a rate affected by the temperature and pH of the solution, (b) surface active materials capable of causing the solution to be converted into a relatively immobile foam as the gas is generated within the solution, (c) a pH-controlling system for initially maintaining a relatively high pH at which the reaction rate is relatively low at temperatures less than the reservoir temperature and subsequently maintaining a barely acidic pH at which the gas-generating reaction rate is moderately fast at temperatures near the reservoir temperature and, (d) a relatively slowly reactive acid-yielding compound in a proportion such that it relatively gradually changes the pH from the initial relatively high value to the subsequent barely acidic value. The so-compounded solution is injected through the well conduits and into contact with the reservoir at a rate such that a significant portion of the solution (a) enters at least the largest pores or other openings in or along the reservoir before generating a significant fraction of the amount of gas it is capable of generating, and, (b) remains within those openings until it becomes a relatively immobile foam.

The invention provides a particularly preferred procedure for diverting a treating fluid into the normally less permeable portions of a reservoir. In that procedure, the pressure on the injected fluid is controlled to cause a preferential breaking of some or all of the foam within the most permeable openings. The foam is formed by a gas having a significantly high pressure. When the pressure on the foam is reduced, the gas expands within the borehole and other large openings, so that, in those locations, the foam tends to quickly break and become a relatively highly mobile mixture of segregated portions of gas and liquid. In the present process, the foam-generating solution is preferably injected at a slow but significant rate. A formation of foam and a resultant reduction of the reservoir permeability becomes apparent from the increase in the injection pressure required to continue the injection. After this occurs, the pressure within the well is reduced, preferably relatively quickly, in order to cause a movement of fluid toward the well and a resultant reduction of the pressure on the foam within the large openings and along the exposed faces of the reservoir formation. The pressure within the well is then increased to move fluid away from the well and displace the segregated gas and liquid, which was formed by the breaking of the foam, into the resultant foam-free portions of the reservoir.

When the pressure is increased within a few hours after the foam-breaking pressure reduction, the foam which was formed relatively deeply within more permeable portions of the rock remains unbroken and immobile. In those locations, the foam does not have time to respond to the pressure reduction. The paths of communication between those locations and the fluid in the wellbore or other large openings tend to be plugged by the foam in the pores of the intervening rock. When the borehole pressure is reduced, the foam breaking occurs quickly in the large openings in which the fluid can move quickly, but occurs slowly in the pores which are isolated by foam-plugged rock formations in which there is little or no fluid movement.

DESCRIPTION OF THE INVENTION

The present invention is, at least in part, premised on discoveries such as the following: A nitrogen gas-generating solution (of the type described in the copending patent applications) can be formulated so that the rate of the gas-generating reaction is first kept very slow at temperatures up to about the reservoir temperature and is then kept at a moderate rate at temperatures near and somewhat above the reservoir temperature. In addition, such a gas-generating solution can be modified by the addition of a surface active material, or a surface active material combined with a water-thickening material and/or emulsified oil, so that the solution is converted to a relatively stiff and immobile foam as gas is formed within the solution. It has now been discovered that the initial pH of such a foam-forming solution can be made high enough to delay the foaming by providing a very slow rate of reaction at temperatures less than the reservoir temperature. This is preferably accomplished by including in the solution a buffer system which is adjusted with a relatively small but significant proportion of additional alkali metal hydroxide that provides an initial pH higher than that which will be maintained by the buffer.

The present delayed and moderated self-foaming solution contains (a) a buffer system which is capable of maintaining a barely acidic to substantially neutral pH (such as from about 5.5 to 7) at which the rate of reaction remains moderate at temperatures equal to and slightly above the reservoir temperature (b) a pH-increasing proportion of additional alkali, which provides an initially high pH at which the rate of reaction is slow and (c) a limited amount of relatively slowly reactive acid-yielding material in a proportion that neutralizes the added alkali so as to readjust the pH to the barely acidic value maintained by the buffer, after the solution has flowed into the reservoir formation.

The present delayed and moderated self-foaming solution is a uniquely advantageous foam-plug-forming material. When it penetrates into a reservoir, all of the components needed for forming a foam are carried into all of the openings that are permeated by the solution. This ensures the formation of a uniformly immobile plug in all of the openings in which the solution is present.

Figure 1:
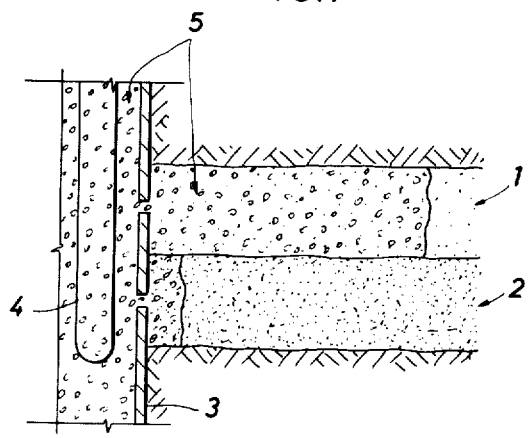
FIGS. 1, 2 and 3 are schematic illustrations of different stages of using the present process to divert a treating fluid into a reservoir zone of relatively low permeability.

FIG. 1 shows a portion of a reservoir which contains a layer of high permeability 1 and a layer of low permeability 2. A well is completed into the reservoir and provided with a perforated casing 3 and an injection tubing string 4. The illustrated situation, in which a foam 5 has formed within the well and the reservoir, results from injecting a portion of delayed and moderated gas-generating solution into the reservoir. As indicated, such a solution will fill the openings within the well and will penetrate farther into the layer of high permeability than into the layer of low permeability.

In the present process, the injection pressure is preferably sufficient for maintaining a slow rate of injection until the flow in response to a pressure less than the reservoir fracturing pressure is substantially prevented by the formation of foam 5, in all portions of the well and reservoir that are occupied by the foam-generating solution.

Figure 2:
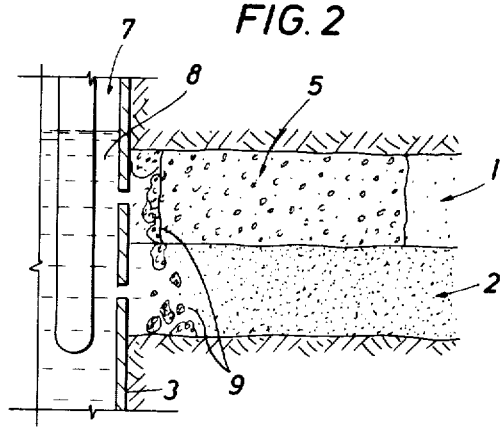

FIG. 2 shows a later stage following a reduction of the well pressure to cause a breaking of the foam within the largest openings and the pores that are near such relatively large openings. The breaking of the foam forms a segregated gas 7 and liquid 8 within the large openings such as the tubing and casing strings. Areas of at least partially broken foam 9 are formed in and along the faces of the reservoir formation. But, a relatively immobile foam 5 remains intact within relatively remote portions of the high permeability layer 1. In those locations the foam-generating liquid penetrates relatively deeply and the foaming forms a substantially impermeable plug that prevents any significant flow of fluid toward the low pressure zone which is created by reducing the pressure within the well.

Figure 3:
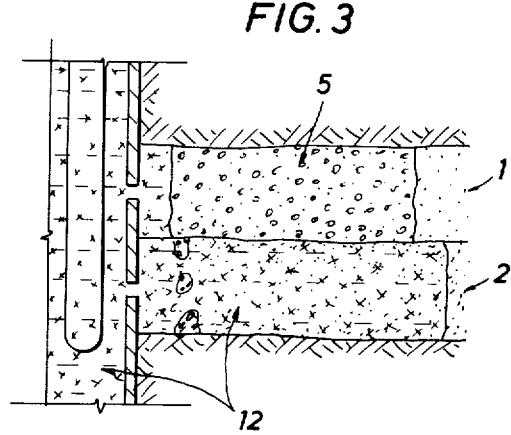

FIG. 3 shows a later stage in which a treating fluid 12 is injected into the reservoir. The injected fluid is diverted by the plugging action of foam 5 and is forced to enter the layer of low permeability 2 behind at least a portion of the segregated gas 7 and liquid 8 formed by the breaking of the foam (not shown).

Figure 4:
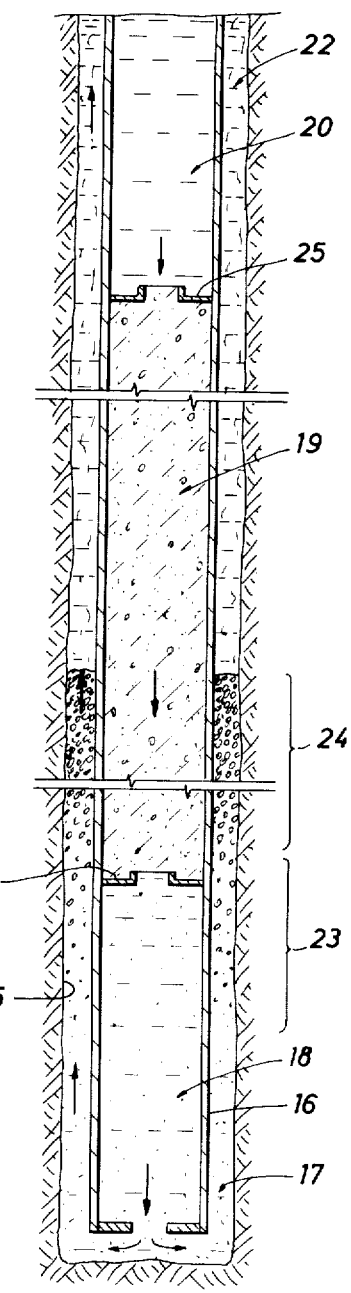
FIG. 4 is a schematic illustration of using the present process in cementing a casing within a well borehole.

FIG. 4 shows a portion of a well borehole 15 into which a pipe string 16 is being cemented. Fluid is being circulated into the borehole through pipe 16 and out through the annulus 17 between the pipe and the borehole wall. In the stage shown, a sequence of a foam-forming liquid 18, a cement slurry 19 and a displacing fluid 20 is being flowed in through pipe 16 while a drilling fluid 22 is being displaced out of the annulus 17. In such a process, when the foam-forming liquid 18 has been subjected to the downhole temperatures for long enough to deplete the excess alkali, it begins a foam-generation in a zone such as zone 23 and produces a foam 24. The so-produced foam is a relatively viscous fluid which is significantly lighter than both the cement slurry and the drilling fluid. Since the foam is formed at the hydrostatic pressure of the column of drilling fluid, the volume of the fluid is increased within the foam-generation zone 23 as the foam is formed and within the foam 24 as it is displaced to shallower depths within the borehole. This volume-increase tends to accelerate the rate at which the drilling fluid is displaced out of the annulus.

In a preferred embodiment, the size and composition of the injected portions of foam-forming liquid 18 is selected so that when the cement slurry 19 is flowed into the annulus and spotted at the depth to be cemented, the foam 24 occupies a substantial amount of the fluid column above the cement. This tends to reduce the hydrostatic pressure on the lower portion of the column of cement slurry to not much more than that provided by the height of the slurry column by itself. It is additionally advantageous in causing significant portions of the foam-generation to occur within and plug any pores of the surrounding earth formation that were, or have become, incompletely plugged by the fluid-loss components of the drilling fluid which is being displaced.

Mechanical spacers 25, such as those conventionally available, are preferably used to keep the injected fluids separate until they reach the lower end of the pipe 16.

Nitrogen-containing gas-forming reactants which are suitable for use in the present process can comprise water-soluble amino nitrogen-containing compounds which contain at least one nitrogen atom to which at least one hydrogen atom is attached and are capable of reacting with an oxidizing agent to yield nitrogen gas within an aqueous medium. Such water-soluble nitrogen-containing compounds can include ammonium salts of organic or inorganic acids, amines, amides, and/or nitrogen/linked hydrocarbon-radical substituted homologs of such compounds, as long as they react with an oxidizing agent to produce nitrogen gas and by-products which are liquid or dissolve in water to form liquids which are substantially inert relative to the well conduits and reservoir formations. Examples of such nitrogen-containing compounds include ammonium chloride, ammonium nitrate, ammonium nitrite, ammonium acetate, ammonium formate, ethylene diamine, formamide, acetamide, urea, benzyl urea, butyl urea, hydrazine, phenylhydrazine, phenylhydrazine hydrochloride, and the like. Such ammonium salts, e.g., ammonium chloride, ammonium formate or ammonium nitrate are particularly suitable.

Oxidizing agents suitable for use in the present process can comprise substantially any water-soluble oxidizing agents capable of reacting with a water-soluble nitrogen-containing compound of the type described above to produce nitrogen gas and the indicated types of by-products. Examples of such oxidizing agents include alkali metal hypochlorites (which can, of course, be formed by injecting chlorine gas into a stream of alkaline liquid being injected into the well), alkali metal or ammonium salts of nitrous acid such as sodium or potassium or ammonium nitrite, and the like. The alkali metal or ammonium nitrites are particularly suitable for use with nitrogen-containing compounds such as the ammonium salts. Since the reaction can occur between ammonium ions and nitrite ions, ammonium nitrite is uniquely capable of providing both the nitrogen-containing and oxidizing reactants in a single compound that is very soluble in water.

Aqueous liquids suitable for use in the present invention can comprise substantially any in which the salt content does not (e.g., by a common ion effect) prevent the dissolving of the desired proportions of N-containing and oxidizing reactants. In general, any relatively soft fresh water or brine can be used. Such aqueous liquid solutions preferably have a dissolved salt content of less than about 1000 ppm monovalent salts and less than about 100 ppm multivalent salts.

Buffer compounds or systems suitable for moderating the rate of gas generation can comprise substantially any water-soluble buffer which is compatible with the gas-forming components and their products and tends to maintain the pH of an aqueous solution at a barely acidic pH at which the reaction rate is only moderately high at temperatures near the reservoir temperature. Such a pH is preferably from about 5.5 to 7. Examples of suitable buffering materials include the alkali metal and ammonium salts of acids such as carbonic, formic, acetic, citric, and the like, acids. A small but significant proportion of alkali metal hydroxide is added to such a buffer system to provide an initially alkaline pH which is higher than that which will be maintained by the buffer and high enough to provide a low rate of reaction at temperatures lower than the reservoir temperature.

Reactants for reducing the pH of the aqueous solution to the barely acidic pH maintained by the buffer can comprise substantially any soluble, relatively easily hydrolyzable materials which are compatible with the gas-forming reactants and their products and are capable of releasing hydrogen ions at a rate slow enough to allow the buffered and pH-increased solution of the gas-generating reactants to be injected into the reservoir formation before the pH is reduced to a value less than about 7. Examples of suitable reactants include: lower alcohol esters of the lower fatty acids such as the methyl and ethyl acetates, formates and the like; hydrolyzable acyl halides, such as benzoyl chloride; relatively slowly hydrolyzable acid anhydrides; relatively slowly hydrolyzable phosphoric or sulfonic acid esters; and the like.

It is generally desirable to use nitrogen-containing compounds and oxidizing agents which are dissolved in substantially stoichiometric proportions and in relatively high concentrations within the gas-generating solution. Such reactants are typified by ammonium chloride and sodium nitrite and they are preferably used in substantially equimolar amounts of from about 3 to 6 moles per liter.

The nitrogen gas-generating reaction of ammonium ions and nitrite ions is known to involve a side reaction which generates hydroxyl ions and increases the pH of the solution. The pH increase caused by the side reaction tends to terminate the generation of nitrogen gas before all of the potential amount has been formed. However, as mentioned in the application Ser. No. 902,636, such an increase in pH can be avoided by including a buffer for maintaining a slightly acidic pH at which there is a relatively slow and constant rate of reaction.

A number of tests of the capabilities of various solutions to generate nitrogen gas were conducted under conditions simulating those encountered within a subterranean reservoir formation. In such tests, the reactants were dissolved in an amount of aqueous liquid filling about one-fourth of the volume of a pressure resistant chamber or bomb. The bomb was maintained at a constant temperature within a circulating bath of liquid and measurements were made of the variations in gas pressure with time. The data obtained from typical tests in which the gas-producing reactants were ammonium chloride and sodium nitrite are listed in Table 1.

TABLE I

| | REACTION PARAMETERS FOR $NH_4^+ + NO_2^-$ REACTION | | | | | | |
|---|---|---|---|---|---|---|---|
| Test No. | Composition $NH_4Cl$ | Moles/Liter $NaNO_2$ | Other Components* | Bath Temp. °F. | pH at 70° F. when prepared | Maximum Pressure Attained psi | $t_{\frac{1}{2}}$ Minutes |
| 1 | 1.0 | 1.0 | .2 NaAc + .2 HAc | 72.5 | 4.50 | 204 | 590 |
| 2 | 1.0 | 1.0 | .2 NaAc + .2 HAc | 113 | 4.50 | 317 | 61 |
| 3 | 2.0 | 1.0 | .2 NaAc + .2 HAc | 113 | 4.47 | 344 | 24 |
| 4 | 1.0 | 1.0 | 1 Methyl Formate | 122 | 6.42 | 380 | 49 |

TABLE I-continued

REACTION PARAMETERS FOR NH$_4^+$ + NO$_2^-$ REACTION

| Test No. | Composition NH$_4$Cl | Moles/Liter NaNO$_2$ | Other Components* | Bath Temp. °F. | pH at 70° F. when prepared | Maximum Pressure Attained psi | t$_{\frac{1}{2}}$ Minutes |
|---|---|---|---|---|---|---|---|
| 5 | 2.0 | 2.0 | .2 NaHCO$_3$ NaHCO$_3$ + .1 MeFor | 210 | 7.12 | 865 | 76 |
| 6 | 3.0 | 2.0 | .2 NaHCO$_3$ | 210 | 6.80 | 917 | 85 |
| 7 | 2.0 | 2.0 | .2 NaHCO$_3$ | 210 | 8.54 | 650 | 681 |
| 8 | 2.0 | 2.0 | .2 NaHCO$_3$ + .3 NaOH + .4 MeFor | 210 | 8.70 | 865 | 72 |
| 9 | 2.0 | 2.0 | .2 NaHCO$_3$ + .3 NaOH + .2 MeFor + .2 MeAc | 210 | 8.65 | 850 | 178 |
| 10 | 2.0 | 2.0 | .2 NaHPO$_4$ +.17 HCl | 210 | 6.50 | 870 | 31 |
| 11 | 2.0 | 2.0 | .2 NaHCO$_3$ + .225 NaOH .245 MeFor | 210 | 8.18 | 795 | 146 |
| 12 | 4.0 | 4.0 | | 130 | 6.17 | 757 | 500 |
| 13 | 4.0 | 4.0 | .15 NaHCO$_3$ | 210 | 6.92 | 248 | 115 |
| 14 | 3.0 | 3.0 | .05 NaHCO$_3$ | 160 | 6.70 | 275 | 981 |
| 15 | 3.0 | 3.0 | .02 NaHCO$_3$ | 160 | 6.56 | 250 | 636 |
| 16 | 2.25 | 3.0 | 1 NH$_4$ Ac | 160 | 6.87 | 371 | 188 |
| 17 | 4.0 | 4.0 | .05 NaHCO$_3$ | 160 | 6.66 | 360 | 660 |
| 18 | 4.0 | 4.0 | .05 NaHCO$_3$ + .05 MeFor | 160 | 6.68 | 520 | 86 |
| 19 | 3.0 | 3.0 | .5 NaAc | 135 | | | 559 |

*NaAc = Sodium Acetate
HAc = Acetic Acid
MeFor = Methyl Formate
**t$_{\frac{1}{2}}$ = Half-life, i.e., the time by which the reactants have produced one-half of the stoichiometically available N$_2$ gas.

In tests 7, 8 and 9, sodium bicarbonate was used as a buffer which was capable of providing a relatively slow rate of reaction at a temperature of 210° F. Test 7 shows that, with that buffer by itself, the half-life was 681 minutes. Test 8 shows that the addition of sodium hydroxide and methyl formate reduced the half-life to 72 minutes. The reaction rate for the hydrolysis of the methyl formate proved to be too fast at the temperature of Test 8. Because of that, the pH was quickly lowered to one at which the gas was quickly produced. Test 9 shows that a mixture of the bicarbonate, sodium hydroxide, methyl formate and methyl acetate provided a half-life of 178 minutes. The tests thus indicate that the slower hydrolysis of the methyl acetate continues the hydrogen ion-releasing after the exhaustion of the methyl formate, so that the pH is kept substantially constant. The data fits second order kinetics during about 80% of the generation of the nitrogen gas. And thus, it is now apparent that such a gas-generating reaction can be significantly delayed for a time and then allowed to proceed; by adding, to a solution which contains a rate-moderating buffering material, both a rate-reducing amount of alkali metal hydroxide and a rate-restoring amount of acid-generating material.

Foam-forming surfactants suitable for use in the present invention can comprise substantially any which are capable of being dissolved or dispersed in an aqueous liquid solution containing the nitrogen containing compound and oxidizing agent and remaining substantially inert during the nitrogen-gas-producing reaction between the nitrogen containing compounds and the oxidizing agent. Examples of suitable surfactants comprise nonionic and anionic surfactants, commercially available from American Alcolac Company, mixtures of the Siponate of similar sulfonate surfactants with sulfated polyoxyalkylated alcohol surfactants, e.g., the NEODOL sulfate surfactant available from Shell Chemical Company; sulfonate sulfate surfactant mixtures, e.g., those described in the J. Reisberg, G. Smith and J. P. Lawson U.S. Pat. No. 3,508,612; petroleum sulfonates available from Bray Chemical Company; Petronates and Pyronates available from Sonnoborn Division of Witco Chemical Company; fatty acid and tall oil acid soaps, e.g., Acintol Heads from Arizona Chemical Company; nonionic surfactants, e.g., Triton X100; and the like surfactant materials which are soluble or dispersible in aqueous liquids.

Water-thickening agents suitable for use in the present process can comprise substantially any water-soluble polymer or gel capable of dissolving in, and/or substantially any solids-free oil capable of being emulsified with, an aqueous liquid solution containing the nitrogen-containing compound and oxidizing agent and remaining substantially inert during the flowing of the resultant nitrogen-gas-producing solution of emulsion into the reservoir formation while also increasing the effective viscosity of the foam which is subsequently generated within the reservoir formation. Examples of suitable thickening agents which are water-soluble include Xanthan gum polymer solutions such as Kelzan or Xanflood available from Kelco Corporation; hydroxyethyl cellulose, carboxymethyl cellulose, guar gum and the like thickening agents. Such soluble thickening agents are particularly effective in relatively low temperature reservoirs having relatively high permeabilities. Suitable oils include relatively viscous refined oil or crude oils which have been freed of substantially all solids.

The correlation between the composition of the nitrogen-gas-forming mixture with the pressure, temperature and volume properties of the reservoir and well components is important. In general, the rate of gas formation tends to increase with increasing temperature and increasing concentration of reactants. With certain reactants the amount of gas production tends to be limited in reservoir formations in which the pressure is particularly high. The use of a water-thickening agent or emulsion is advantageous in reducing the amount of the gas-generating solution which penetrates into the initially least permeable zone of the reservoir formation.

The presently claimed invention can advantageously be used to improve an oil production process such as the process of U.S. Pat. No. 3,893,511, on producing oil from a reservoir having a dual permeability system, such as a highly-fractured tight reservoir. In the patented process, alternate slugs or separate streams of an aqueous foaming agent solution and a relatively oil-soluble gas, such as CO, are injected into the reservoir. Such fluids are injected to form a foam which tends to plug the fractures and force the gas into the less permeable rock matrix where it contacts and dissolves in and/or displaces the oil. The well is then backflowed and the so-contacted oil is recovered by a solution gas drive and/or gas-induced displacement of the oil.

In utilizing the present invention to improve such a process, the present delayed and moderated foam-generating solution is used as the aqueous surfactant solution which is injected along with the oil-soluble gas. Such an improvement reduces the extent to which oil is bypassed due to the gas and the foaming agent solution flowing along separate paths and failing to meet and form a foam within the reservoir.

When a gas and a liquid are injected into any reservoir having a significant amount of vertical permeability the gas tends to override the liquid. This occurs quickly within relatively large openings such as those within a borehole or a fracture. Thus, in a process such as that of U.S. Pat. No. 3,893,511, at least some of the intended foam formation may fail to occur because the injected fluids flow along separate paths.

But, when the injected fluid is the present type of delayed and moderated self-foaming solution, it contains within itself all of the components needed to generate a foam and is beginning a moderately rapid generation of a foam substantially as soon as it reaches the reservoir. This causes the foam to be formed in every opening that is penetrated by the liquid. Soon after an initial portion of the foam-forming liquid enters the bottom portion of the reservoir formation, it forms a foam plug that tends to divert succeeding portions of that liquid into the foam-free pores in the upper portion of the formation. Thus, an alternate injection of the slugs of the present type of foam-forming solution with slugs of a relatively oil-soluble gas such as $CO_2$ tends to ensure that substantially all of the permeable openings through the whole vertical extent of the reservoir will be plugged with relatively immobile portions of foam which will divert the gas into less permeable rock matrix. And, this tends to ensure that, during a backflow production cycle, oil will be recovered from substantially all of the reservoir interval.

It is also known that the in situ generation of a foam or a relatively homogeneous dispersion of a gas in a liquid may tend to preferentially reduce the effective permeability of the most permeable portion of a subterranean reservoir in a manner tending to increase the amount of oil which can be recovered by means of fluid displacement. For example, U.S. Pat. No. 3,269,460 describes the need for such a preferential plugging of the more permeable layers of a layered heterogeneously permeable oil reservoir. It recommends injecting a pressurized solution of a gas so that bubbles will be released downstream and the injected solution will become a slug of a foam or a dispersion of gas in liquid which preferentially reduces the effective permeability of the layers which were initially the most permeable. Similarly, U.S. Pat. No. 3,653,440 describes a process in which an oil-displacing surfactant system is driven through a reservoir formation by a mixture of gas and aqueous liquid in which the mobility is relatively low due to the gas being dispersed within the liquid.

For reasons such as those discussed above, the process of the present invention can advantageously be used to ensure that in such fluid-drive oil-recovery process, such as that of U.S. Pat. No. 3,653,440, the foam is formed within each portion of the reservoir which is penetrated by the liquid component of an injected foam-forming mixture of gas and aqueous surfactant solution. Such a use of the present process is particularly attractive for relatively shallow reservoirs, such as those at depths of less than about 5000 feet. In such reservoirs, the delayed and moderated foam-generating solutions of the present invention can be both: (1) delayed and moderated relatively extensively, because of a relatively low reservoir temperature, so that the production of gas can be rather extensively delayed and kept relatively slow in at least a latter portion of at least one slug of the foam-forming surfactant solution; and (2) the concentration of the gas-generating reactants in at least a latter portion of, or at least one slug of, such a foam-forming surfactant solution can be relatively high and a corresponding reduction can be made in the amount and rate to which it is necessary to compress a gas in order to inject the gaseous component of the mobility-reducing foam which is to be generated within the reservoir.

What is claimed is:

1. A process for treating a subterranean reservoir into which a well is completed comprising:
   compounding an aqueous solution in which the solutes consist essentially of at least one each of (a) a reactive compound for generating nitrogen gas at a rate affected by the temperature and pH of the solution, (b) a surface-active compound for causing the solution to be converted to a relatively immobile foam as gas is generated within the solution, (c) a pH-controlling system for initially maintaining a relatively high pH at which the gas-generating reaction rate is relatively slow at temperatures less than the reservoir temperature and subsequently maintaining a barely acidic pH at which that reaction rate is only moderately fast at temperatures near the reservoir temperature and, (d) a relatively slowly reactive acid-yielding compound for relatively slowly reducing the solution pH from said relatively high value to said barely acidic value; and,
   injecting the compounded solution into the reservoir at a rate such that (a) a significant portion of injected solution flows into at least the largest pores or other openings in or along the reservoir rock before that portion of solution has generated a significant fraction of the amount of gas it is capable of generating and (b) said portion of injected solution remains within said openings until it becomes converted into a relatively immobile foam.

2. The process of claim 1 in which:
   the pressure within said well is subsequently reduced to cause the breaking of at least a portion of said relatively immobile foam; and,
   the pressure within said well is subsequently increased to displace fluid into openings which were initially plugged by said relatively immobile foam.

3. The process of claim 2 which said reservoir is being treated by increasing the permeability of the initially least-permeable openings in or along said reservoir and said treatment is improved by:
   flowing a slug of reservoir-treating fluid for removing organic or inorganic permeability impediments into the well behind a slug of said compounded aqueous solution; and,
   initiating said foam-breaking well pressure reduction at least before flowing a significant portion of the reservoir treating fluid into the openings in or along the reservoir rock.

4. The process of claim 3 in which the reservoir treating fluid is an acidizing solution.

5. The process of claim 1 in which said reservoir is being treated by cementing a pipe within the borehole of a well which is initially substantially full of drilling fluid and said treatment is improved by:

circulating fluid into the well through the pipe to be cemented and out of the well through the annular space between the pipe and the borehole wall;

flowing into the pipe a sequence of slugs comprising said compounded aqueous solution, a cement slurry and a displacing fluid;

flowing substantially all of said compounded aqueous solution through the pipe and into the annular space around it; and, flowing at least a portion of the drilling fluid out of the well by displacing it with foam formed by said compounded aqueous solution.

6. The process of claim 1 in which:

said reservoir being treated contains oil within a dual permeability system into which alternating slugs of relatively oil-soluble gas and aqueous surfactant solution are to be injected, so that foam is formed within the most permeable portions of the reservoir system to divert gas into the less permeable portions from which oil is subsequently produced by backflowing fluid into the well; and, the efficiency of said foam-forming and gas-diverting functions are improved by using as said aqueous surfactant solution a delayed and moderated foam-forming aqueous solution compounded as specified in claim 1.

7. The process of claim 6 in which said oil-soluble gas is carbon dioxide.

8. The process of claim 1 in which:

said reservoir being treated is an oil-containing reservoir into which a mixture of gas and an aqueous surfactant solution is to be injected in order to form a foam which preferentially reduces the effective permeability of the portions of the reservoir which were initially the most permeable; and, the efficiency of said preferential reduction of effective permeability is improved by using as the injected aqueous surfactant solution a delayed and moderated foam-forming aqueous solution compounded as specified in claim 1.

9. The process of claim 8 in which an oil-displacing aqueous surfactant system capable of lowering the interfacial tension against the reservoir oil to less than about 0.01 dyne per centimeter is injected ahead of said injected mixture of gas and aqueous surfactant solution.

10. The process of claim 8 in which the so-injected gas is carbon dioxide.

* * * * *